United States Patent [19]

Kervagoret

[11] Patent Number: 4,852,952
[45] Date of Patent: Aug. 1, 1989

[54] HYDRAULIC BRAKE CIRCUIT FOR MOTOR VEHICLE, HAVING A DUAL CIRCUIT IN THE FORM OF A CROSS AND A WHEEL ANTI-LOCK DEVICE

[75] Inventor: Gilbert Kervagoret, Argenteuil, France

[73] Assignee: Bendix France, Drancy, France

[21] Appl. No.: 233,409

[22] Filed: Aug. 18, 1988

[30] Foreign Application Priority Data

Sep. 30, 1987 [FR] France ................... 87 13501

[51] Int. Cl.⁴ .................... B60T 8/26; B60T 17/18
[52] U.S. Cl. ........................... 303/110; 303/10;
303/92; 303/116; 303/119; 303/84.2; 303/111;
188/151 A
[58] Field of Search .................. 303/91, 92, 113, 115,
303/116, 117, 119, 68, 69, 93, 10–12, 110, 111,
84.1, 84.2; 188/181 A, 181 R, 151 A

[56] References Cited

U.S. PATENT DOCUMENTS

| 3,861,757 | 1/1975 | Jackson et al. | 303/92 |
| 3,973,806 | 8/1976 | Inada et al. | 303/92 |
| 4,099,793 | 7/1978 | Iio | 303/116 |
| 4,116,495 | 9/1978 | Belart | 303/110 X |
| 4,395,073 | 7/1983 | Arikawa et al. | 303/116 |
| 4,416,347 | 11/1983 | Bertling et al. | 303/110 X |
| 4,477,125 | 10/1984 | Belart et al. | 303/116 |
| 4,703,979 | 11/1987 | Nakanishi et al. | 303/116 |
| 4,729,611 | 3/1988 | Kircher et al. | 303/116 |
| 4,730,877 | 3/1988 | Seibert et al. | 303/116 X |
| 4,758,054 | 7/1988 | Brown | 303/110 X |
| 4,778,226 | 10/1988 | Brown | 303/110 X |
| 4,779,935 | 10/1988 | Kuwana et al. | 303/116 |
| 4,796,957 | 1/1989 | Wakata et al. | 303/116 |

FOREIGN PATENT DOCUMENTS

| 2351488 | 4/1975 | Fed. Rep. of Germany . |
| 2911966 | 10/1980 | Fed. Rep. of Germany . |
| 3439066 | 4/1986 | Fed. Rep. of Germany . |
| 3517958 | 11/1986 | Fed. Rep. of Germany . |
| 3601769 | 7/1987 | Fed. Rep. of Germany . |
| 2187521 | 9/1987 | United Kingdom . |

Primary Examiner—Douglas C. Butler
Attorney, Agent, or Firm—Larry J. Palguta; Ken C. Decker

[57] ABSTRACT

The circuit according to the invention is provided with a wheel anti-lock device of the type with independent control of the front wheels and control of the back wheel brakes by way of the pressure in the brake associated with the back wheel having the lowest resistance to skid. It comprises a safety device protecting the normal functioning of the circuit against escapes from the release valves (18, 18', 18") of the isolation-release electrovalves (11, 11', 11") and against the failure of a single pump (28) which resupplies the circuit directly from the reservoir (3) of the tandem master cylinder (2). A pressure regulator (7) avoids reactions on the brake pedal (2). The circuit may be applied to an anti-locking brake circuit having increased compactness and reliability.

16 Claims, 1 Drawing Sheet

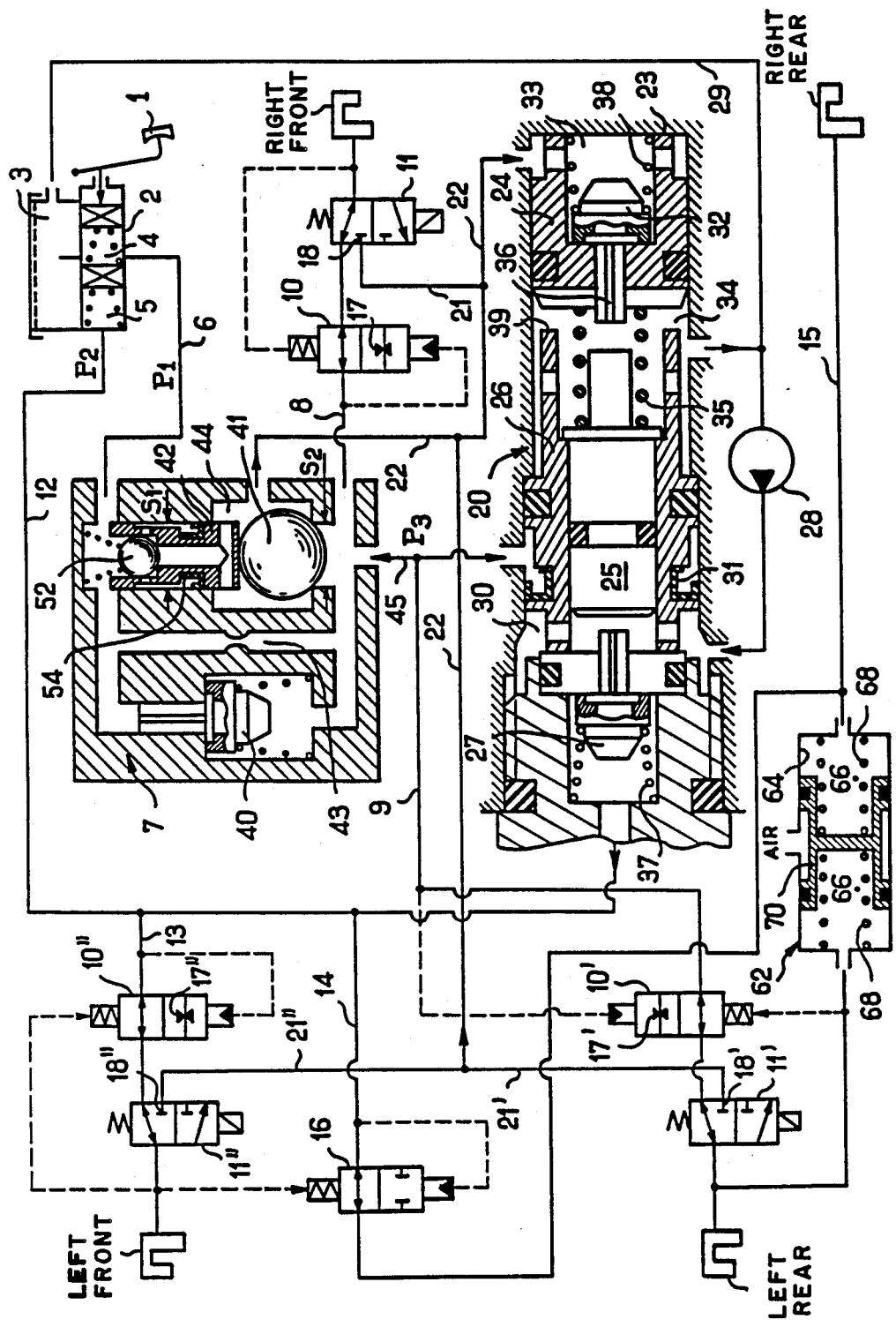

HYDRAULIC BRAKE CIRCUIT FOR MOTOR VEHICLE, HAVING A DUAL CIRCUIT IN THE FORM OF A CROSS AND A WHEEL ANTI-LOCK DEVICE

The present invention relates to a hydraulic brake circuit for motor vehicle, having a dual circuit in the form of a cross and a wheel anti-lock device and, more particularly, to such a circuit in which the anti-lock device is designed such that it can simply be superimposed on a conventional hydraulic brake circuit.

There is known, from U.S. patent application No. 159,620 in the name of the applicant, such a circuit comprising a master cylinder activated by a servobrake controlled by a pedal, a brake associated with each wheel of the vehicle, an electrovalve to close the brake circuit normally and, under the control of the anti-lock device, to release the pressure in the wheel brake by bringing the latter into communication with means for storing the brake fluid of the circuit. These storage means comprise a first accumulator and a pump connected to the "release" output of the electrovalve, a second high-pressure accumulator connected between the output of the pump and a non-return valve, the pump being started up by the anti-lock control device at the same time as the electrovalve. Because of its configuration as a dual circuit in the form of a cross, the unit thus has a total of four accumulators and two pumps with, as a result, a reliability which decreases with the number of these apparatuses and a bulkiness which increases with the same number.

The object of the present invention is thus to improve the reliability and reduce the bulkiness of a brake circuit having a dual circuit in the form of a cross and a wheel anti-lock device, the latter comprising only a single pump which is directly connected on the "suction" side to the reservoir of the master cylinder to provide permanently a maximum flow rate to the circuit, in contrast to what is the case in circuits which can only deliver what is received by the capacities or pressurized accumulators, originating from the release electrovalves, not taking into account the delays for restarting the pump.

In particular, the object of the present invention is to construct such a circuit comprising a security device and a pressure regulator to regulate the pressures in the circuit around the value corresponding to the "pedal position" exhibited by the driver at the moment of intervention of the anti-lock device.

In addition, the object of the present invention is to construct such a device which has only one capacity, replacing the total number of capacities or accumulators installed, for example, in the circuit of the above-mentioned U.S. patent application.

Moreover, the object of the present invention is to construct such a circuit designed to be associated with an anti-lock device of the type in which the pressures of the brake fluid in the front wheel brake motors are controlled separately, while the back wheel having the lowest resistance to skid controls the setting of a same pressure of fluid in the back wheel brake motors.

These objects of the invention, and others which will emerge in the following, are achieved according to the invention, in which there is provided a hydraulic brake circuit for motor vehicle, having a dual primary and secondary circuit in the form of a cross for supplying the wheel brake motors and a tandem master cylinder with reservoir, this circuit being provided with a wheel anti-lock device of the type in which the pressures of a brake fluid in the front wheel brake motors are controlled separately, while the back wheel having the lowest resistance to skid controls the setting of the same pressure of fluid in the back wheel brake motors, these pressures being governed by an admission-release electrovalve associated respectively with each of the front wheels and with the rear axle, each electrovalve comprising a release valve, the circuit being resupplied in the anti-lock period by a single pump connected directly on the suction side to the reservoir of the tandem master cylinder, this circuit being characterized in that it comprises a safety device which is hydraulically connected to the release valves of the electrovalves and to the delivery side of the pump and which is provided with a valve means controlled by the delivery pressure of the pump to isolate the release valves of the electrovalves from the reservoir of the master cylinder for normal braking or in the case of a pump failure and to return the brake fluid which has come from these valves to the reservoir during the anti-lock period, when the pressure of the fluid which is delivered by the pump reaches a predetermined level signifying the proper functioning of the pump.

The safety device of the circuit according to the invention furthermore comprises a variable capacity which is connected to the release valves of the electrovalves and which carries the valve means, a piston controlled by the pressure of the fluid on the delivery side of the pump to cause the valve means to open when this pressure reaches the predetermined level, second and third non-return valve means furthermore ensuring that the primary and secondary circuits of the dual circuit in the form of a cross are resupplied by the fluid delivered by the pump.

The circuit according to the invention furthermore comprises a pressure regulator which is installed in the primary circuit and is sensitive, by way of the safety device, to the pressure prevailing in the secondary circuit, to ensure regulation of the pressures in the primary and secondary circuits, at the location of the master cylinder, in the vicinity of the value of the pressure exerted on a control pedal of the master cylinder by the driver of the vehicle, at the moment when a phase of operation of the anti-lock device commences.

In the accompanying drawing, which is given solely by way of example, the single FIGURE represents diagrammatically the brake circuit, having an anti-lock device, according to the invention.

The invention will now be described with reference to the drawing, in which it is evident that the brake circuit according to the invention conventionally comprises two circuits in the form of a cross, the primary and secondary circuits, respectively controlling the front right and rear left brake motors associated with the right front wheel and left back wheel on the one hand, and the left front and right rear brake motors respectively associated with the left front wheel and right back wheel on the other hand. The primary circuit and the secondary circuit are put under pressure when a brake pedal (1) is actuated, which acts, possibly by means of a servobrake (not shown), on a tandem master cylinder (2) associated with a reservoir of brake fluid (3). The primary and secondary circuits are respectively connected to chambers (4) and (5) of the tandem master cylinder (2). According to the invention, the primary circuit is connected by a line (6) to a pressure regulator (7) which will be described in detail below. Lines (8)

and (9) connect the pressure regulator (7) to the right front and left rear brake motors respectively, by way of pilot-operated valves (10, 10') and admission-release electrovalves (11, 11') respectively. The secondary circuit is connected to the left front brake motor by lines (12), (13), by way of a pilot-operated valve (10") and an admission-release electrovalve (11"). This secondary circuit is furthermore connected to the right rear brake motor by lines (14) and (15), by way of a pilot-operated valve (16), the function of which will be described in detail below. The valves (10, 10', 10") and the electrovalves (11, 11', 11") form part of a wheel anti-lock device controlled by a computer (not shown). Each of the valves, (10, 10', 10") occupies one or the other of two positions, in such a manner as to be conductive in one position and to bring a restriction (17, 17', 17") into the line which it controls, respectively, in the other position. The functioning of these valves, which are controlled by upstream/downstream pressures in the line, is conventional in anti-lock devices of this type and will not be described in more detail.

The electrovalves (11, 11' and 11") are admission-release electrovalves having three channels and two conventional positions, and are controlled by the anti-lock device computer. Their operation is well known, and it will merely be noted that these electrovalves comprise a release valve (18, 18', 18") respectively, which is subject to accidental escapes, as is well known in the art. As will be seen in the following, the safety device incorporated in the circuit according to the invention overcomes this disadvantage.

With normal braking, the driver of the vehicle acts in conventional fashion on the brake motors by exerting a force on the pedal (1), which is converted into fluid pressure by the master cylinder (2) and transmitted into the primary and secondary circuits by the lines (6), (9), (12), (13), (14) and (15) to the brake motors, while the pilot-operated valves and the electrovalves are in the admission positions shown in the FIGURE.

When a tendency to locking in one of the wheels of the vehicle occurs, the anti-lock device computer controls the movement of the corresponding electrovalve into the "release" position. In this position, the release valve (18, 18' or 18") of the electrovalve concerned is then connected to a safety device (20) which forms parts of the circuit according to the invention by lines (21, 21', 21") which respectively connect the valves (18, 18' and 18") to a collecting line (22) connected to the device (20).

The safety device (20) essentially comprises, coaxially installed in a stepped bore (23), a piston (24) delimiting a variable capacity and a piston (25) sliding in a stationary sleeve (26) between this capacity and a non-return valve (27). According to the invention, a single pump (28) is connected on the admission side by a line (29) to the reservoir (3) of the tandem master cylinder (2). On the delivery side, the pump is connected to a chamber (30) of the safety device, this chamber being located between the piston (25) and the valve (27). The brake fluid which is refilled into the chamber (30) by the pump (28) passes into the secondary circuit by means of the valve (27), which is calibrated, and, on the other hand, into the line (9) of the primary circuit and into the pressure regulator (7), which will be described in detail below, by way of a non-return valve (31) which consists of a sealing collar mounted on the sleeve (26). This sealing collar has the function of a non-return valve which is practically uncalibrated, and allows the passage of the brake fluid from the chamber (30) to the line (9) and the regulator (7), above the external edge of the collar, while preventing any passage of fluid in the other direction, as is well known.

The safety device (20) further comprises a valve means piston (32) separating a chamber (33) of the variable capacity (24) from a chamber (34) connected to the reservoir (3) by means of the line (29), which is itself connected to the suction side of the pump (28). A spring (35) installed in the chamber (34) loads the piston (25) and the piston (24) to be apart from one another. The valves (27) and (32) are calibrated by springs (37) and (38) respectively. The capacity piston (24) thus forms, with the spring (35), a small resilient capacity of low volume, limited by coming up to stop against one end (39) of the sleeve (26). This capacity, which is of the order of a cubic centimeter, enables any escaped fluid collected by the line (22) to be amassed and to conserve them there if the valve (32) is not pushed back into its initial position, and thus to protect the brake circuit.

There will now be described the functioning of the safety device according to the invention. When a tendency to locking of one vehicle wheel is detected, the anti-lock device triggers the start-up of the pump (28), this starting up has the effect of raising the pressure of the brake fluid in the chamber (30) and thus of causing the displacement of the piston (25), which then propels the control rod (36) of the valve (32), and thus opens the latter. The chamber (33) of the capacity is thus brought into communication with the reservoir (3) by means of the chamber (34) and the line (29). If, in this case, this action of the anti-lock does not cause the pump to start up, for example because of a switched off electrical supply wire, the chamber (33) is flooded without any consequence to the quality of normal braking. Furthermore, a pump which is in poor working order cannot overcome the calibration of the spring (35), to which there is added the action of the pressure of the fluid which is accumulated in the chamber (33) on the value (32).

The flow of the pump is divided into two parts at the chamber (30) to supply the primary circuit by way of the collar (31) which serves as a non-return valve and the secondary circuit by way of the valve (27). The escape pressure of the collar (31) is practically zero, while, according to the invention, the pressure of opening the valve (27), which is of the order of a few bars, is lower than the pressure of opening the valve (32). The result is that any breakdown in the primary circuit or the secondary circuit limits the delivery pressure of the pump (28) to the calibrated value of the valve (27) or to the escape pressure value of the collar (31). The result is that the valve (32) remains closed and thus protects the circuit which is not broken down against escapes from the release valves.

The presence of a continuous flow at the output of the pump (28) in the anti-lock phase tends to return the pedal (1) which is under pressure to its high position. It is therefore necessary to provide a device enabling the pressures around the value corresponding to the "pedal position" at the moment of intervention of the anti-lock device to be regulated in order to avoid a disagreeable "pedal sensation" for the driver. This is the function of the pressure regulator (7) which is incorporated in the device according to the invention.

This regulator essentially comprises a non-return valve (40) and a ball valve (41) which limits pressure, and is associated with a thruster (42) which is movable in the body of the regulator (7). A narrow section (43) short-circuits the valve (40). The ball of the valve (41) is placed in a chamber (44) connected on the one hand to the line (22) and on the other hand, by way of the seat of the ball, to the line (8). The ball valve (40) allows fluid to pass from the line (6) to the line (8), the upstream side of the valve (40) being connected by the line (6) to the chamber (4) of the master cylinder (2) in the primary circuit. The downstream side of the valve (40) is connected by a line (45) on the one hand to the line (9) and on the other hand to the downstream side of the sealing collar (31) which is carried by the sleeve (26) of the piston (25).

In the phase of function in anti-lock, the flow of the pump (28) towards the primary circuit of the master cylinder is stopped by the valve (40). Only a small predetermined quantity is allowed to pass through the narrow section (43) which serves to limit depressions of the pedal. The non-used surplus of flow of the pump is evacuated to the reservoir via the duct (22) and the chambers (44) and (33), by way of the pressure-limiting valve (41).

If P1 is the pressure in the primary circuit at the output of the master cylinder (2), while P3 is the pressure regulated at (45) by the pressure-limiting valve (41), then:

$$P3 \# P1 \times (S1)/S2,$$

where S1 represents the section of the thruster (42), S2 represents the section of the seat of the pressure-limiting valve (41), with S1 being slightly larger than S2 (symbol # means "slightly different from").

In order for the system to remain stable, it is necessary for the calibration $\Delta P2$ of the valve (27) to be such that:

$$\Delta P2 \geqq P3 - P2,$$

to avoid the pedal rising again by means of the secondary circuit (for example P2=P3>P1).

The thruster (42) furthermore supports a small valve (52) calibrated at a low value, of which the function is:
  (a) to empty the primary circuit on release of braking by way of the valve (41),
  (b) to prevent the retaining of a residual pressure in the chamber (33).

The presence of a sealing collar (54) on the thruster (42) is sufficient to guarantee a pressure of practically zero in the chamber (44).

It is possible to envisage, in brake circuits of low or average fluid displacement, substituting the collar (54) for the valve (52) to simplify the structure of the pressure regulator.

There is described below the functioning of the electrohydraulic stages of the circuit according to the invention. As has been seen above, each of the front left, front right and back right wheels is asociated with an admission-release electrovalve (11, 11', 11''), and with a pilot-operated valve (10, 10', 10'') of a known design, the function of which is to close the direct passage from the master cylinder to the brake by way of the associated electrovalve and to replace this direct passage by a restriction (17, 17', 17'') which moderates the renewed increase in pressure in the brake.

Each valve (10, 10', 10'') is closed as soon as the first release appears on the electrovalve which is associated with it. This closure remains until the end of braking. As has been seen above, a fourth pilot-operated valve (16) is placed in parallel on the left front wheel control. The function of this valve is to isolate the right back wheel from the left wheel and from the master cylinder.

This isolation is obtained either by exciting the electrovalve (11'') which is associated with the left front wheel, if a tendency to locking of the latter is relieved by anti-lock device, or by a brief excitation of this same electrovalve, if the tendency to locking is detected on the right front wheel. The duration of this excitation, in this case, is fixed such that only the valve (16) is closed during the impulse. This result is arrived at by calibrating the spring of the valve (16) to a value below that of valves (10, 10', 10'').

Furthermore, closure of the valve (16) when locking of the right front wheel is detected is controlled only at the first release of the latter.

As soon as the valve (16) closes, the right back wheel is controlled by the left back wheel by way of an element (62) for balancing pressures in the back wheel brake motors. This element consists of a cylinder (64) divided into two substantially equal spaces (66) by a double-sealed piston (70) which is in contact with the open air, and is held in the central position by two identical pre-stressed springs (68).

It is understood that a tendency to locking of the left back or right back wheels, which brings about the excitation of the electrovalve (11') associated with the left back wheel, causes a loss in pressure which is substantially identical in the two brake motors of the back wheels. The same applies to the resupply. The spaces (66) are determined such that a temporary closure of the valve (16) does not bring about a loss in efficiency in the rear axle (for example during a temporary transition from low grip to high grip on the road). The pump (28), in resupplying the chamber (66) on the left back wheel side, swells again at the same time as the right rear brake by compression of the space (66) associated with it.

Valves (10, 10' and 10''), because of their locations in the circuit according to the invention, have no influence on the speeds of pressure release and only effect the duration of resupply of the brakes by way of the restriction (17, 17', 17''), the value of which must be optimized.

Thus, owing to the invention, there is available an anti-lock brake circuit of improved reliability and compactness, by the use of a single pump and a single capacity. The security of the circuit is ensured both from the point of view of possible failure of the pump and of escapes from the release valves of the electrovalves. Furthermore, the pressure regulator introduced into the circuit improves the comfort of the driver by suppressing reactions on the brake pedal.

It will also be noted that the circuit in the form of a cross according to the invention enables the use of a wheel anti-lock device having four speed sensors functioning in a configuration of "independent front wheels" and controls the rear brake motors by the latter, associated with the wheel having the lowest resistance to skid, this device having only three electrovalves with three channels and two positions. This solution is thus particularly economical. Moreover, technically, the use of a single pump connected directly to the reservoir of the tandem master cylinder advantageously permits a continuous flow and a zero pressure reference on release to be obtained. It should be noted in addition that the circuit according to the invention retains all the characteristics of anti-lock device circuits designed simply to be superimposed on a conventional hydraulic brake circuit.

I claim:

1. A hydraulic brake circuit for motor vehicle, having a dual primary and secondary circuit in the form of a cross for supplying wheel brake motors and a tandem master cylinder with reservoir, the circuit being provided with a wheel anti-lock device of the type in which pressures of a brake fluid in front wheel brake motors are controlled separately, while a back wheel having the lowest resistance to skidding controls the setting of the same pressure of fluid in back wheel brake motors, the pressures being governed by an admission-release electrovalve associated respectively with each front wheel and with a rear axle, each electrovalve comprising a release valve, the circuit being resupplied in an anti-lock phase by a single pump connected directly on a suction side to the reservoir of the tandem master cylinder, characterized in that the circuit comprises a safety device which is hydraulically connected to the release valves of the electrovalves and to a delivery side of the pump and which is provided with first valve means controlled by the delivery pressure of the pump to isolate the release valves of the electrovalves from the reservoir of the master cylinder for normal braking and in the case of a pump failure and to return the brake fluid which has come from the valves to the reservoir during the anti-lock phase, when the pressure of the fluid which is delivered by the pump reaches a predetermined level signifying proper functioning of the pump.

2. The circuit according to claim 1, characterized in that the safety device furthermore comprises a variable capacity piston which is connected to the release valves of the electrovalves and which carries the first valve means, a first piston controlled by the pressure of the fluid on the delivery side of the pump to cause the first valve means to open when the pressure reaches the predetermined level, second and third non-return valve means, respectively, furthermore ensuring that the primary and secondary circuits ae respectively resupplied by the fluid delivered by the pump.

3. The circuit according to claim 2, characterized in that the first valve means, the first piston and the variable capacity piston are arranged coaxially in a bore, the first piston and the capacity piston being loaded to be apart from one another by a spring placed in a first chamber of the bore which communicates with a suction side of the pump and the reservoir of the tandem master cylinder.

4. The circuit according to claim 3, characterized in that the first piston is movable in a stationary sleeve placed in the bore, the sleeve carrying a sealing collar constituting the second non-return valve means.

5. The circuit according to claim 4, characterized in that the non-return valve means are calibrated to only a few bars while an opening of the first valve means is only acutated at a substantially higher pressure corresponding to the predetermined level signifying the proper functioning of the pump.

6. The circuit according to claim 2, characterized in that the circuit furthermore comprises a pressure regulator which is installed in the primary circuit and is sensitive, by way of the safety device, to the pressure (P2) prevailing in the secondary circuit, to ensure regulation of the pressures in the primary and secondary circuits, at the location of the master cylinder, in the vicinity of an exerted pressure established by a master cylinder by the force exerted on a pedal controlling the master cylinder at the moment when a phase of operation of the anti-lock device commences.

7. The circuit according to claim 6, characterized in that the pressure regulator comprises fourth valve means which, in the anti-lock phase, recycles part of the fluid delivered by the pump to the reservoir by way of a second chamber controlled by this fourth valve means and a line connecting the chamber to the variable capacity piston.

8. The circuit according to claim 7, characterized in that the calibration of the third non-return valve means is such that $$\Delta P2 \geq P3 - P2$$

where P2 is the pressure in the secondary circuit and P3 is the pressure regulated by the pressure regulator at a value slightly greater than the pressure in the primary circuit.

9. The circuit according to claim 8, characterized in that the pressure regulator furthermore comprises a narrow section to allow a small quantity of brake fluid to retun to the master cylinder by means of the primary circuit such that the small quantity of brake fluid limits depression of the pedal, connected to the master cylinder, during the anti-lock phase.

10. The circuit according to claim 9, characterized in that a regulator non-return valve is placed in parallel with the narrow section to prevent the pump delivering to the primary circuit by means of the regulator non-return valve.

11. The circuit according to claim 10, characterized in that the fourth valve means is connected to a thruster which furthermore supports a valve which is smaller and calibrated to only a few bars, to empty the primary circuits on release of braking by way of the fourth valve means and thus to eliminate any residual pressure in the second chamber of the regulator and a third chamber of variable capacity, respectively.

12. The circuit according to claim 10, characterized in that the fourth valve means is associated with a thruster which supports a sealing collar oriented such that the sealing collar allows the primary circuit to be emptied on release of braking by way of the fourth valve means and thus to eliminate any residual pressure in the second chamber of the regulator and a third chamber of variable capacity, respectively.

13. The circuit according to claim 1, characterized in that the circuit comprises a pilot-operated valve placed in parallel with a restriction valve and a electrovalve connected to a front wheel brake motor of the secondary circuit to isolate the brake motor associated with the rear wheel of the same circuit as the front wheel and the master cylinder in the case where the anti-lock device acts on one of the front wheels, and an element for balancing pressures in the back wheel brake motors located between the back wheel brake motors.

14. The circuit according to claim 13, characterized in that a spring of the pilot-operated valve is calibrated to a value below that of springs of restriction valves connected respectively to the admission release electrovalves.

15. The circuit according to claim 14, characterized in that the element for balancing pressures is in the form of a cylinder divided into two substantially equal spaces by a piston held in a central position by two identical pre-stressed springs, each of the spaces being hydraulically connected to the brake motors associated with the right and left back wheels, respectively.

16. The circuit according to claim 15, characterized in that the piston is double-sealed and is vented immediately with the intermediate open air.

* * * * *